United States Patent
Dorenbosch et al.

(10) Patent No.: US 6,285,282 B1
(45) Date of Patent: Sep. 4, 2001

(54) SYSTEM AND APPARATUS FOR DETECTING AND COMMUNICATING A FRESHNESS OF A PERISHABLE PRODUCT

(75) Inventors: Jheroen P. Dorenbosch, Paradise; R. Louis Breeden, Azle, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/655,255

(22) Filed: Sep. 5, 2000

(51) Int. Cl.⁷ .................................................. G08B 21/00
(52) U.S. Cl. ....................... 340/540; 340/665; 340/686.1; 340/572.1
(58) Field of Search ..................... 340/572.1, 540, 340/686.1, 665, 568; 62/125; 73/718

(56) References Cited

U.S. PATENT DOCUMENTS

| | | | |
|---|---|---|---|
| 5,610,340 | * 3/1997 | Carr et al. ............................... | 73/718 |
| 5,689,238 | * 11/1997 | Cannon, Jr. et al. ................. | 340/568 |
| 5,711,160 | * 1/1998 | Namisniak et al. .................... | 62/125 |
| 5,798,694 | * 8/1998 | Reber et al. ........................... | 340/540 |
| 5,882,068 | 10/1998 | Beaudry et al. ...................... | 356/417 |
| 5,917,009 | * 6/1999 | Oosedo et al. ......................... | 528/480 |
| 5,969,606 | * 10/1999 | Reber et al. ........................... | 340/540 |
| 6,111,520 | * 8/2000 | Allen et al. ...................... | 340/870.16 |

* cited by examiner

Primary Examiner—Benjamin C. Lee
Assistant Examiner—Phung Nguyen
(74) Attorney, Agent, or Firm—R. Louis Breeden; Charles W. Bethards

(57) ABSTRACT

A wireless tag (102) is mechanically attached to a product. The wireless tag includes a product freshness detector (204) and a communicator (208) coupled to the product freshness detector for communicating the freshness to a user. The wireless tag also includes a wireless power supply (202) coupled to the product freshness detector and coupled to the communicator for powering the wireless tag from a wireless energy source. A reader (104) powers the wireless tag and includes a transmitter (702) for generating wireless energy for powering the wireless tag. The reader also includes a user interface (708) for providing control of the reader by the user.

20 Claims, 3 Drawing Sheets

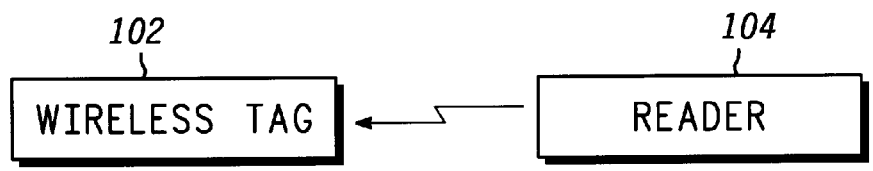
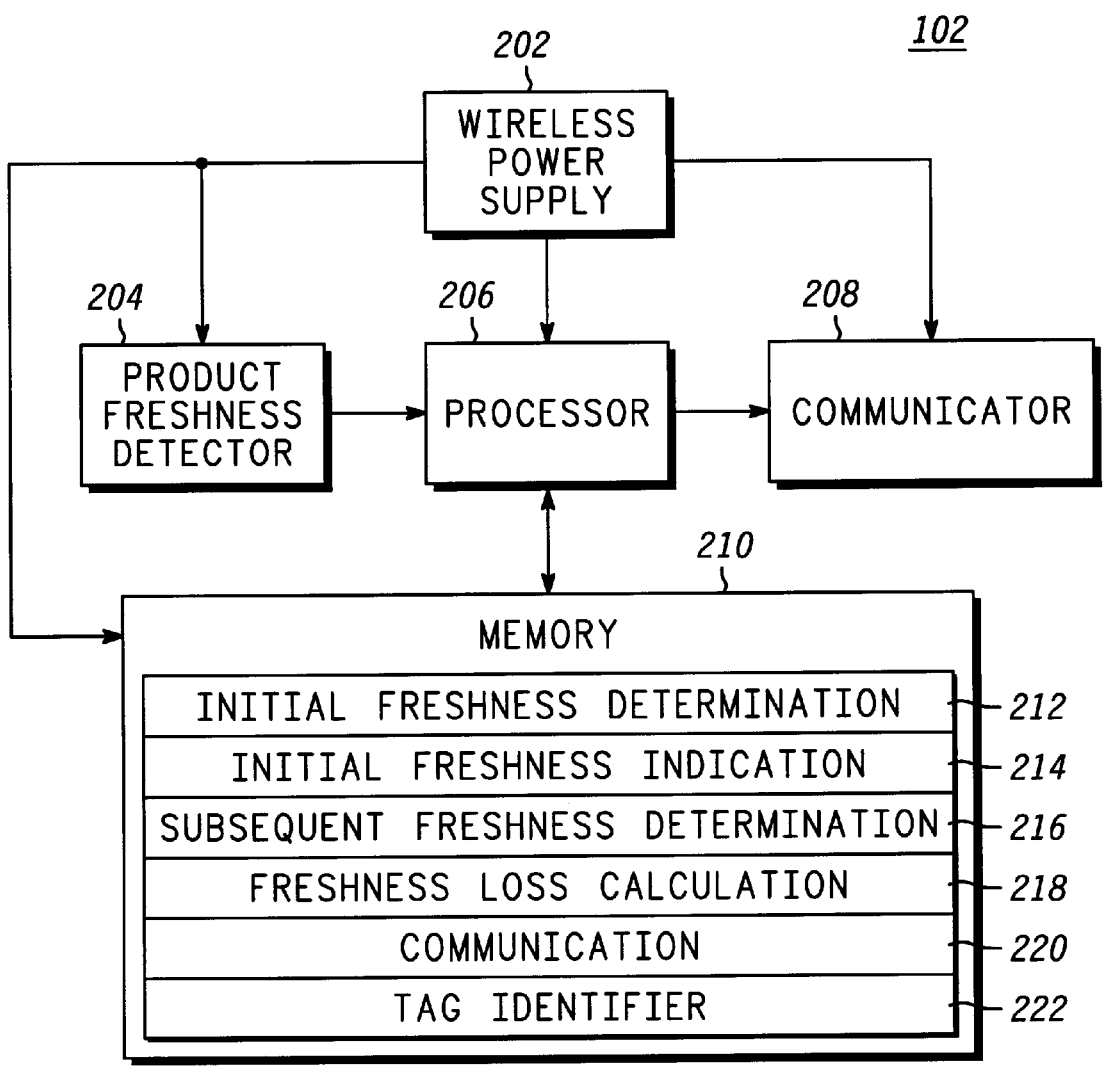

SYSTEM AND APPARATUS FOR DETECTING AND COMMUNICATING A FRESHNESS OF A PERISHABLE PRODUCT

FIELD OF THE INVENTION

This invention relates in general to wireless communication systems, and more specifically to a system and apparatus for detecting and communicating a freshness of a perishable product.

BACKGROUND OF THE INVENTION

Perishable products, such as fresh produce, meat, and fish are problematic for storekeepers, because the storekeepers must regularly inspect such products for freshness. Inspection is laborious, expensive, and subjective.

What is needed is a system and apparatus for objectively detecting and communicating a freshness of a perishable product. The system and apparatus preferably will be inexpensive and easy to operate and will reliably detect products that are no longer fresh.

BRIEF DESCRIPTION OF THE DRAWINGS

FIG. 1 is an electrical block diagram of an exemplary system for detecting and communicating a freshness of a product in accordance with the present invention.

FIG. 2 is an electrical block diagram of an exemplary wireless tag in accordance with the present invention.

DETAILED DESCRIPTION OF THE DRAWINGS

Figure 3:
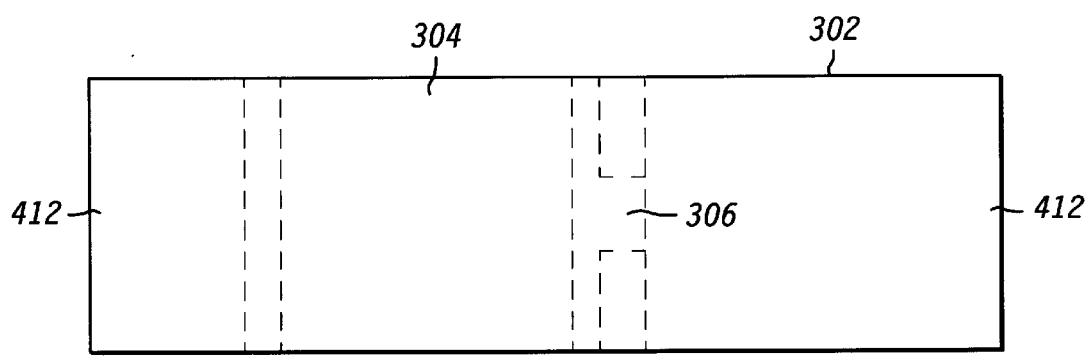
FIG. 3 is a top orthogonal view of an exemplary first embodiment of a product freshness detector in accordance with the present invention.

Referring to FIG. 1, an electrical block diagram depicts an exemplary system 100 for detecting and communicating a freshness of a product in accordance with the present invention. The system 100 comprises one or more wireless tags 102 for detecting and communicating a freshness of perishable products to which the wireless tags are mechanically attached. The system 100 further comprises a reader 104 for generating wireless energy for powering the wireless tag 102. In one embodiment in accordance with the present invention, the reader 104 also includes a receiver for receiving an indication of the product freshness from a transmitter in the wireless tag, and a user interface for conveying the indication to a user. The wireless tag 102 and the reader 104 preferably are similar to the Motorola BiStatix™ RF tag or the Tag-it™ RF identification system smart labels and readers manufactured by Texas Instruments of Dallas, Tex., modified in accordance with the present invention. The wireless tag 102 and the reader 104 are described further herein below.

Referring to FIG. 2, an electrical block diagram depicts the exemplary wireless tag 102 in accordance with the present invention. The wireless tag 102 comprises a conventional wireless power supply 202 for powering the wireless tag 102 when in the presence of a sufficiently strong wireless energy source, e.g., a radio signal, or, alternatively, a light source. The wireless tag 102 also includes a product freshness detector 204 for detecting the freshness of a product to which the wireless tag is mechanically attached, as described further herein below. The product freshness detector 204 preferably is coupled to a conventional processor 206 for controlling the wireless tag 102. The processor 206 is also coupled to a communicator 208 for communicating the freshness to a user. In a first embodiment, the communicator 208 comprises a conventional display for displaying an indication of the product freshness. In a second embodiment, the communicator 208 comprises a wireless transmitter for transmitting an indication of the freshness to the reader 104, which then conveys the indication of the freshness to the user through a user interface, e.g., a conventional display or loudspeaker. It will be appreciated that, in some embodiments, a plurality of product freshness detectors 204 can be included in a single wireless tag 102. In such embodiments the detected freshness indications are preferably communicated separately by the communicator 208. Alternatively, the detected freshness indications can be combined by the processor 206 and a single value communicated.

In addition, a memory 210 is preferably coupled to the processor 206. The memory 210 comprises space for storing variables and operating software for programming the processor 206 in accordance with the present invention. In one embodiment, the memory 210 includes an initial freshness determination program 212 for programming the processor 206 to cooperate with the product freshness detector 204 to determine an initial freshness indication 214 of the product to which the wireless tag 102 is attached. The processor 206 then stores the initial freshness indication 214 in the memory 210. The memory 210 also includes a subsequent freshness determination program 216 for programming the processor 206 to subsequently cooperate with the product freshness detector 204 to determine a subsequent freshness indication of the product. The memory 210 also includes a freshness loss calculation program for programming the processor 206 to compare the subsequent freshness indication with the initial freshness indication 214 to determine an amount of freshness loss.

The memory 210 further comprises a communication program 220 for programming the processor 206 to cooperate with the communicator 208 to communicate an indication of the amount of freshness loss to the user. It will be appreciated that, alternatively, the wireless power supply 202 can store a portion of the energy received from the wireless energy source, and can "awaken" periodically to update the freshness loss indication even in the absence of the wireless energy source. It will be further appreciated that, alternatively, in an embodiment without the initial freshness determination and storage, the communication program 220 can program the processor 206 to communicate an absolute freshness level to the user.

The memory 210 also includes a tag identifier 222 for uniquely identifying the wireless tag 102 when reporting an initial freshness indication and a subsequent freshness indication to the reader 104, in embodiments in which the reader 104, instead of the wireless tag 102, calibrates the freshness loss based upon the initial freshness indication.

Figure 4:
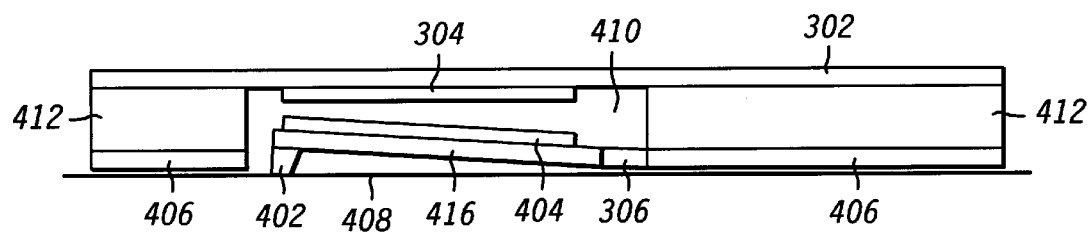
FIG. 4 is a side orthogonal view of the first embodiment of the product freshness detector in accordance with the present invention.

Referring to FIGS. 3 and 4, top and side orthogonal views, respectively, depict an exemplary first embodiment of the product freshness detector 204 in accordance with the present invention. The product freshness detector 204 comprises top and bottom substrates 302, 406 separated by a filler 412. The top and bottom substrates 302, 406 are preferably constructed of polycarbonate plastic. The filler 412 is preferably polycarbonate plastic. A cavity 410 is formed in the filler 412. A portion 416 of the bottom substrate 406 within the cavity 410 has one end flexibly attached to an adjacent portion of the bottom substrate 406, preferably by a narrowed area 306 of the bottom substrate 406. A variable capacitor is formed by a first capacitor electrode 404 mechanically attached to the top of the portion 416 proximate a corresponding second capacitor electrode 304 mechanically attached to the bottom of the top substrate 302. The first and second capacitor electrodes 404, 304 are preferably constructed of a copper plated polyimide flexible substrates adhesively attached to the top and bottom substrates 302, 406. A probe 402 is mechanically attached to a free end of the portion 416 opposite the flexibly-attached end. The probe 402 is preferably constructed of polycarbonate plastic. It will be appreciated that, alternatively, the top and bottom substrates, the filler 412, and the probe 402 can be molded as one contiguous piece of polycarbonate plastic. It will be further appreciated that, alternatively, other similar materials can be used to construct the first embodiment of the product freshness detector 204.

The product freshness detector 204 is arranged such that, when it is attached to a product with the probe 402 in contact with the surface 408 of the product, the portion 416 and the first capacitor electrode 404 are forced closer to the second capacitor electrode 304, thereby increasing the capacitance. Simultaneously, a downward force is produced between the probe 402 and the surface 408 by the flexing of the narrowed area 306. As the product ages and the surface 408 becomes softer, the downward force causes the probe 402 to sink deeper into the product, thereby decreasing the capacitance. By periodically monitoring the capacitance through well-known techniques, the wireless tag 102 advantageously can determine when the product has lost its freshness and can so indicate. Two techniques for measuring capacitance, for example, are measuring impedance of the capacitor at a given frequency, and measuring a frequency of an oscillator tuned by the capacitor.

Figure 5:
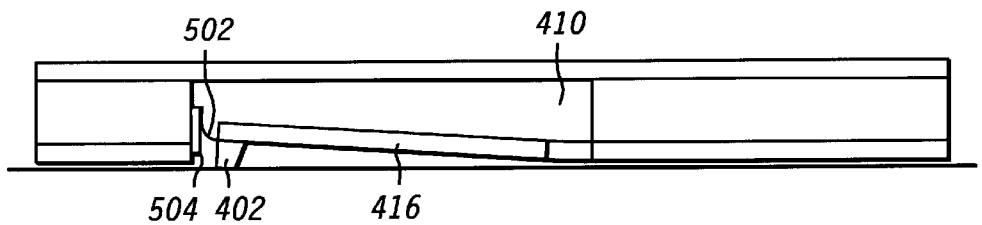
FIG. 5 is a side orthogonal view of an exemplary second embodiment of the product freshness detector in accordance with the present invention.

Referring to FIG. 5, a side orthogonal view depicts an exemplary second embodiment of the product freshness detector 204 in accordance with the present invention. The second embodiment is similar to the first embodiment of FIGS. 3 and 4, the essential difference being that the first and second capacitor electrodes 404, 304 have been removed and replaced by a linear resistive element 504 mechanically attached to a side of the cavity 410 proximate the probe 402, and a wiping contact 502 attached to the portion 416 near the probe, the wiping contact 502 arranged to slide up and down the linear resistive element 504, depending upon the position of the probe 402. By periodically monitoring the resistance between the wiping contact 502 and one end of the linear resistive element 504 through well-known techniques, the wireless tag 102 advantageously can determine when the product has lost its freshness and can so indicate. The linear resistive element 504 is preferably constructed of a conventional carbon composition material, such as that used in potentiometers. The wiping contact 502 is preferably constructed of gold plated spring steel. Other similar materials can be utilized as well for the linear resistive element 504 and the wiping contact 502.

Figure 6:
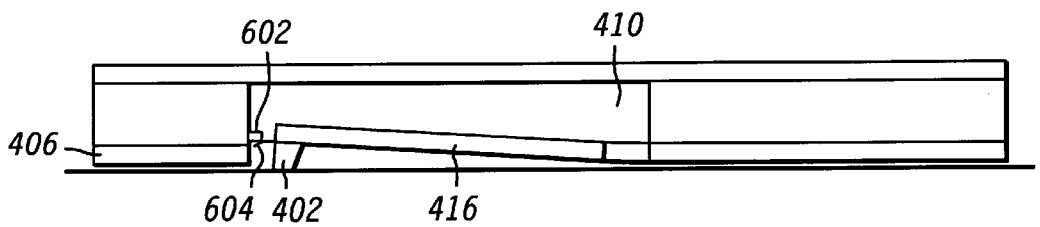
FIG. 6 is a side orthogonal view of an exemplary third embodiment of the product freshness detector in accordance with the present invention.

Referring to FIG. 6, a side orthogonal view depicts an exemplary third embodiment of the product freshness detector 204 in accordance with the present invention. The third embodiment is similar to the first embodiment of FIGS. 3 and 4, the essential difference being that the first and second capacitor electrodes 404, 304 have been removed and replaced by a first switch contact 602 mechanically attached to a side of the cavity 410 proximate the probe 402, and a second switch contact 604 attached to the portion 416 near the probe 402. The first switch contact 602 is preferably gold-plated steel. The second switch contact 604 is preferably a flexible material arranged to bend when the tip of the probe 402 is flush with the bottom surface of the bottom substrate 406. A suitable material for the second switch contact 604 is gold-plated spring steel. While the third embodiment can indicate only a limited number of freshness levels (two as shown; three with a double-throw switch arrangement), making calibration difficult, the wireless tag 102 utilizing the third embodiment advantageously can be constructed very economically. For example, the processor 206 and the memory 210 can be eliminated, and a predetermined freshness indication displayed by the communicator 208 when power is available from the wireless power supply 202 and the switch 602, 604 is closed, and nothing displayed when the switch 602, 604 is open.

It will be appreciated that the product freshness detector 204 also can use chemical detection means for detecting the presence of a chemical, such as ammonia or trimethylamine (TMA), which is present in, for example, spoiled fish. An example of a suitable ammonia detector is the microelectronic ammonia detector available from Customised Sensor Solutions, AMT Ireland, University of Limerick, National Technological Park, Plassey, Limerick, Ireland. An example of a Trimethylamine detector is the $TiO_2$ Sensor described in a paper by M. Egashira et al. during the 40th Annual Meeting of the International Society of Electrochemistry, in September, 1989, at Kyoto, Japan. Either of these two chemical detectors can interface with the processor 206 through well-known techniques, and in accordance with appropriate application information from the manufacturer, for determining the freshness of products which produce ammonia or TMA when spoiled. It will be appreciated that, alternatively, chemicals other than ammonia and TMA may be more appropriately detected as an indication of lack of freshness, depending upon the particular product being evaluated.

Figure 7:
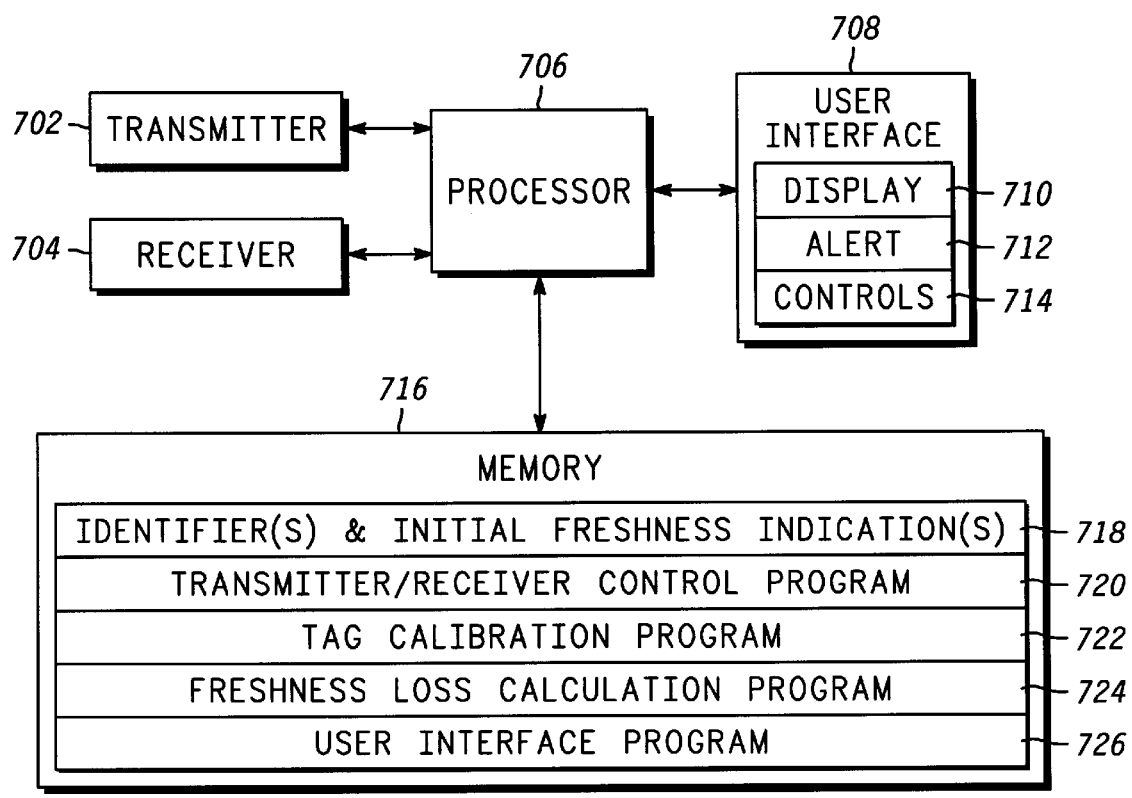
FIG. 7 is an electrical block diagram of an exemplary reader for powering and reading the wireless tag in accordance with the present invention.

Referring to FIG. 7, an electrical block diagram depicts the reader 104 for powering and reading the wireless tag in accordance with the present invention. The reader 104 comprises a transmitter 702 for generating a wireless energy source for powering the wireless tag 102. The reader 104 also preferably includes a receiver 704 for receiving a wireless signal from the wireless tag 102, the wireless signal carrying an indication of a freshness of a perishable product to which the wireless tag 102 is attached. The receiver 704 and the transmitter 702 are coupled to a processor 706 for controlling the reader 104 and for processing the indication. In addition, the reader 104 comprises a user interface 708 coupled to the processor 706 for conveying the indication to a user. The user interface 708 preferably includes a conventional display 710, a conventional alert device 712, and conventional user controls 714, e.g., buttons or knobs, for providing control of the reader 104 by the user.

The reader 104 preferably includes a memory 716 coupled to the processor 706 for storing variables and operating software for programming the processor 706 in accordance with the present invention. The memory 716 comprises space for storing identifiers and initial freshness indications 718 received from one or more wireless tags 102. The memory 716 further comprises a transmitter/receiver control program 720 for programming the processor 706 to control the transmitter 702 and the receiver 704 in accordance with the present invention. The memory 716 also includes a tag calibration program 722 for programming the processor 706 to cooperate with the receiver 704 to receive the identifier and the initial freshness indication from one of the wireless tags; and to cooperate with the memory 716 to store the identifier and the initial freshness indication, thereby calibrating the wireless tag 102 corresponding to the identifier. In addition, the memory 716 includes a freshness loss calculation program 724 for programming the processor 706 to subsequently cooperate with the receiver 704 to receive the identifier and a subsequent freshness indication, and to compare the subsequent freshness indication with the initial freshness indication of the wireless tag 102 corresponding to the identifier to determine an amount of freshness loss. The memory 716 also includes a user interface program 726 for programming the processor 706 to cooperate with the user interface 708 to convey the amount of freshness loss to the user and to generate an audible or visible alert when the amount of freshness loss is above a predetermined threshold. It will be appreciated that, in embodiments which do not perform a calibration of freshness from the initial freshness indication, the user interface program 726 programs the processor 706 to cooperate with the user interface 708 to convey an uncalibrated indication of freshness to the user, and to generate an alert when the uncalibrated indication indicates that the freshness of the product is below a predetermined threshold. It will be appreciated that, in an alternative embodiment, the receiver 704, the processor 706, the memory 716, the display 710, and the alert 712 can be omitted, and the reader 104 used solely for providing power to the wireless tag 102, which then displays the product freshness directly.

It should be clear from the preceding disclosure that the present invention provides a system and apparatus for objectively detecting and communicating the freshness of a perishable product. The system and apparatus advantageously is inexpensive and easy to operate and can reliably detect products that are no longer fresh.

Many modifications and variations of the present invention are possible in light of the above teachings. For example, one of ordinary skill in the art will be able to devise many arrangements other than the examples presented herein above for detecting mechanical properties and/or chemical emissions indicative of product spoilage. Thus, it is to be understood that, within the scope of the appended claims, the invention can be practiced other than as specifically described herein above.

What is claimed is:

1. A wireless tag for detecting and communicating a freshness of a perishable product, the wireless tag comprising:
  a product freshness detector attached to the perishable product;
  a communicator coupled to the product freshness detector for communicating the freshness to a user; and
  a wireless power supply coupled to the product freshness detector and coupled to the communicator for powering the wireless tag from a wireless energy source.

2. The wireless tag of claim 1, wherein the communicator comprises a display for displaying the freshness to the user.

3. The wireless tag of claim 1, wherein the communicator comprises a wireless transmitter for transmitting an indication of the freshness to a reader.

4. The wireless tag of claim 1, wherein the product freshness detector comprises a spring-loaded probe to be placed against a surface of the product for detecting softness in the product.

5. The wireless tag of claim 4,
  wherein the product freshness detector further comprises a variable capacitor, and
  wherein the spring-loaded probe is mechanically coupled to the variable capacitor such that the variable capacitor is adjusted in response to a change in position of the probe.

6. The wireless tag of claim 4,
  wherein the product freshness detector further comprises a variable resistor, and
  wherein the spring-loaded probe is mechanically coupled to the variable resistor such that the variable resistor is adjusted in response to a change in position of the probe.

7. The wireless tag of claim 4,
  wherein the product freshness detector further comprises a switch, and
  wherein the spring-loaded probe is mechanically coupled to the switch such that the switch is operated in response to a change in position of the probe.

8. The wireless tag of claim 1, wherein the product freshness detector comprises a chemical detector positioned proximate the product for detecting a chemical indicative of a lack of freshness of the product.

9. The wireless tag of claim 8, wherein the chemical detector is an ammonia detector.

10. The wireless tag of claim 8, wherein the chemical detector is a trimethylamine (TMA) detector.

11. The wireless tag of claim 1, further comprising:
  a processor coupled to the product freshness detector, the communicator, and the wireless power supply for controlling the wireless tag; and
  a memory coupled to the processor for storing an initial freshness indication,
  wherein the processor is programmed to
    cooperate with the product freshness detector and the memory to determine and store the initial freshness indication.

12. The wireless tag of claim 11, wherein the processor is further programmed to:
  subsequently cooperate with the product freshness detector to determine a subsequent freshness indication;
  compare the subsequent freshness indication with the initial freshness indication to determine an amount of freshness loss; and
  cooperate with the communicator to communicate an indication of the amount of freshness loss to the user.

13. A reader for powering and reading a wireless tag, comprising:
  a transmitter for generating wireless energy for powering the wireless tag;
  a receiver for receiving a wireless signal from the wireless tag, the wireless signal carrying an indication of a freshness of a perishable product to which the wireless tag is attached;
  a processor coupled to the transmitter and to the receiver for controlling the reader and processing said indication; and
  a user interface coupled to the processor for conveying said indication to a user.

14. The reader of claim 13, wherein the user interface comprises an alert device coupled to the processor for generating an alert when said indication indicates that the freshness of the product is below a predetermined threshold.

15. The reader of claim 13, further comprising:

a memory coupled to the processor for storing an identifier and an initial freshness indication when received from the wireless tag, and wherein the processor is programmed to:
  cooperate with the receiver to receive the identifier and the initial freshness indication from the wireless tag; and
  cooperate with the memory to store the identifier and the initial freshness indication, thereby calibrating the wireless tag corresponding to the identifier.

16. The reader of claim 15, wherein the processor is further programmed to:

subsequently cooperate with the receiver to receive the identifier and a subsequent freshness indication;

compare the subsequent freshness indication with the initial freshness indication to determine an amount of freshness loss; and cooperate with the user interface to convey the amount of freshness loss to the user.

17. The reader of claim 16, wherein the user interface comprises an alert device coupled to the processor for generating an alert when the amount of freshness loss is above a predetermined threshold.

18. A system for detecting and communicating a freshness of a perishable product the system including:

the wireless tag, comprising:
  a product freshness detector attached to the perishable product;
  a communicator coupled to the product freshness detector for communicating the freshness to a user; and
  a wireless power supply coupled to the product freshness detector and coupled to the communicator for powering the wireless tag from a wireless energy source; and a reader for powering the wireless tag, the reader comprising:
  a first transmitter for generating wireless energy for powering the wireless tag; and
  a user interface for providing control of the reader by the user.

19. The system of claim 18, wherein the communicator comprises a display for displaying the freshness to the user.

20. The system of claim 18, wherein the communicator comprises a second transmitter for wireless transmission of an indication of the freshness to the reader, and wherein the reader further comprises:
  a receiver for receiving the indication from the second transmitter; and
  a processor coupled to the first transmitter, the user interface, and the receiver for controlling the reader and processing said indication, wherein the user interface is arranged to convey said indication to the user.

* * * * *